(No Model.)  3 Sheets—Sheet 1.

W. H. COOLEY.
ELECTRIC MOTOR.

No. 561,699.  Patented June 9, 1896.

Figure 1

Witnesses:
Howard L. Wilson
Harrison L. Wilson

Inventor:
Wm. H. Cooley.

United States Patent Office.

WILLIAM H. COOLEY, OF BROCKPORT, NEW YORK.

ELECTRIC MOTOR.

SPECIFICATION forming part of Letters Patent No. 561,699, dated June 9, 1896.

Application filed March 12, 1895. Serial No. 541,420. (No model.)

*To all whom it may concern:*

Be it known that I, WILLIAM H. COOLEY, a citizen of the United States, residing at Brockport, county of Monroe, and State of New York, have invented certain new and useful Improvements in Electric Motors, of which the following is a specification.

The object of my invention is the construction of an alternating-current motor which shall have a more uniform torque at different speeds, and at the same time shall have a strong tendency toward synchronism, and one that shall have an increased starting-torque and shall be capable of operation, when so desired, as a single-phase lag-motor.

With this object in view my invention may consist in two elements bearing the relation to each other of field and armature, of substantially the usual construction, in combination with a third element, which may consist of either an armature or field located in operative relation to one of such first-named elements. Between this third element and that one of the other elements located in operative relation thereto, by means of alternating currents traversing the windings on one or both of them, there is at once established and maintained a relative synchronous rotation. This relative synchronous rotation may consist entirely in the rotation of the third element, in which case such third element will be located in operative relation to the fixed one of the other two elements, or such third element may be located in operative relation to the rotatable one of the other two elements, and in this case such synchronous rotation will consist at the start in the rotation of the third element, which will gradually come to a state of rest as the other element, located in operative relation thereto, starts up and gradually approaches synchronous rotation. While the construction and arrangement just above described is in many respects preferable, I would have it understood that I am not limited thereto, it being only necessary that there should be means for establishing and maintaining between one of such first-named elements of armature or field and such third element a relative synchronous rotation. By means of this relative synchronous rotation between the third element and the other one, located in operative relation thereto, by means of devices, located on and carried by each of such elements, coöperating together, such alternating currents are caused to produce in a winding on one of such first-named elements a rotatively progressing field or fields, progressing at all times and under all circumstances a certain fixed angle for each alternation of such alternating current, when such motor is to be used as a synchronous motor or as a lag-motor. At the same time and by means of devices similarly carried, operating and coöperating, I cause such alternating currents to be rectified, when they may be supplied to the field and armature constituting the first two elements in substantially the usual manner. I have herein shown and described only one modification of my present invention—that is, when the third element is located in operative relation to the rotating one of the other two elements; but obviously, without departing from the spirit of my invention, many changes and modifications may be made therein, adapting it to different styles of construction and to different uses. Many features of my present invention are applicable to direct-current machinery and electric machinery in general, although they are herein shown and described in connection with alternating-current machinery.

My invention further consists in current-directing devices for supplying alternating currents to the windings on both the armature and field of an alternating-current motor, constituting means for producing in such armature and in such field magnetic poles which shall remain constant in sign for all rates of relative rotation between such armature and such field and for maintaining a constant angular relation between such poles so produced in such elements.

The accompanying drawings, illustrating my invention, are as follows.

Similar letters and numerals refer to similar parts throughout the several views.

As in alternating-current machinery in general, I construct my fields and armatures of laminations.

Figure 1:
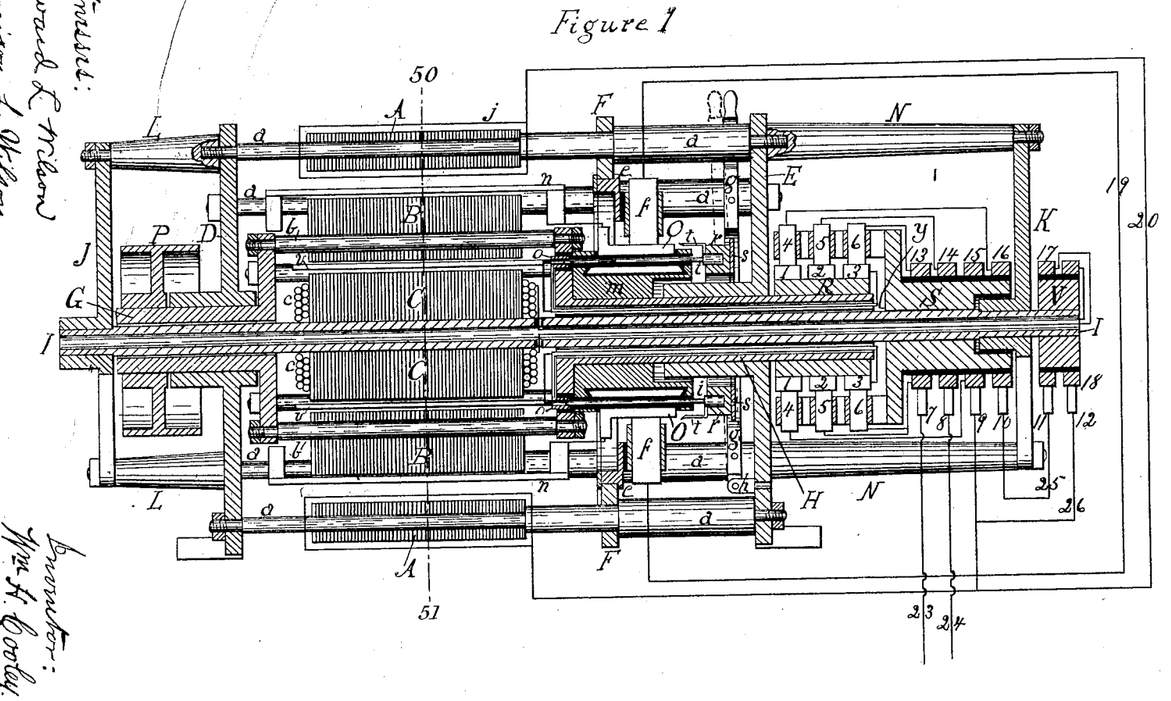
Figure 1 is a vertical longitudinal section taken through the center of the machine.
Figures 5, 8:
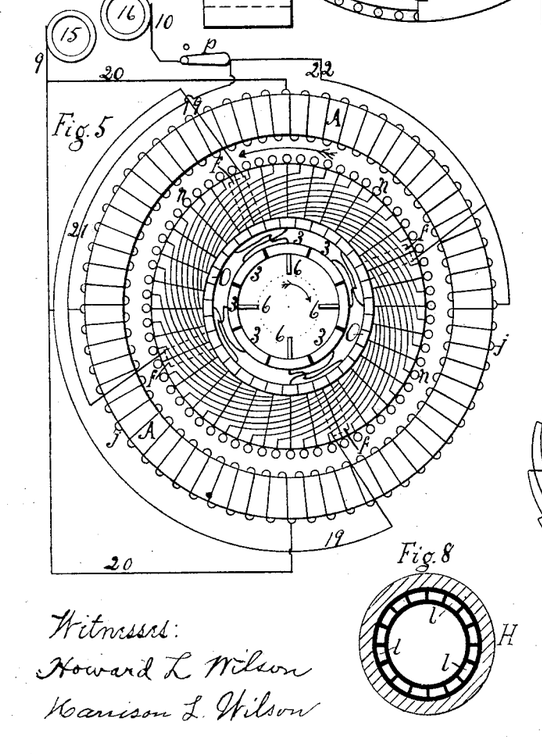
Fig. 5 shows in diagram the field-windings and the external armature-windings and their connections.
Fig. 8 shows in vertical transverse section sleeve H of Fig. 1, showing also the manner of carrying the sixteen conductors $y$ therethrough.

Referring to the drawings, A constitutes the external annular field, ring-wound, with a closed coil and supported by means of bolts $a$ between the end plates D and E, circular in form and having feet on their lower ends, and forming at their centers, respectively, bearings for the sleeves G and H. Between the disks formed on the inner ends of these sleeves G and H is supported the annular armature B by means of the bolts $b$. The internal field C, in this case of the Siemens armature type, is supported and secured upon the hollow shaft I, having a bearing at its left-hand end in the three-armed plate J, supported by studs L from end plate D. This shaft I is supported at its right-hand end in a bearing on the similar plate K, supported by studs M from the end plate E. This shaft I carries at its extreme right-hand end the metal hub V, upon which are located the insulated collector-rings 17 and 18, upon which bear, respectively, springs 11 and 12. Rings 17 and 18 are connected by wires, through the hollow shaft I, with the winding $c$ on the field C, as shown. Shaft I also carries near its right-hand end the metallic hub S, upon which are located the four insulated collector-rings 13, 14, 15, and 16. Hub S also carries upon arms formed thereon, as shown, the trailing brushes 4, 5, and 6, there being two of the brushes 4 and two of the brushes 5 and four of the brushes 6, located in opposite pairs ninety degrees apart, only two of them being seen in Fig. 1. On these collector-rings 13, 14, 15, and 16 bear springs, respectively, 7, 8, 9, and 10. Sleeve G carries the pulley P, while sleeve H, as seen in Figs. 1 and 8, has passing therethrough the sixteen conductors $y$, all insulated from each other and contained within the space between two insulating-tubes. For this purpose two concentric tubes of micanite, fiber, or vulcanite may be used, and in the space between them the conductors may be insulated from each other by strips of micanite, hard fiber, or vulcanite, forming separating partitions between the conductors $y$.

Figures 2, 4:
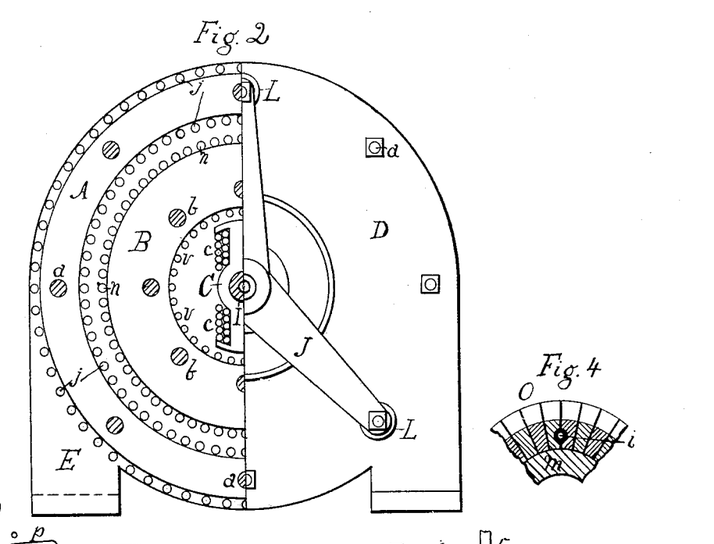
Fig. 2 shows to the right of the central vertical line an end view, and to the left a vertical transverse section taken through the center of the field and armature, say along the line 50 51 on Fig. 1.
Fig. 4 shows in a vertical transverse section a portion of the commutator O.
Figure 3:
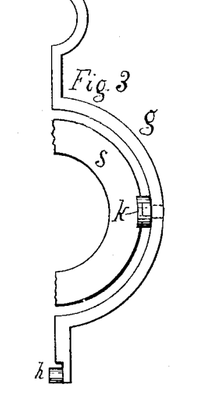
Fig. 3 shows in end view one of the equal halves of the switching-lever *g*.
Figure 9:
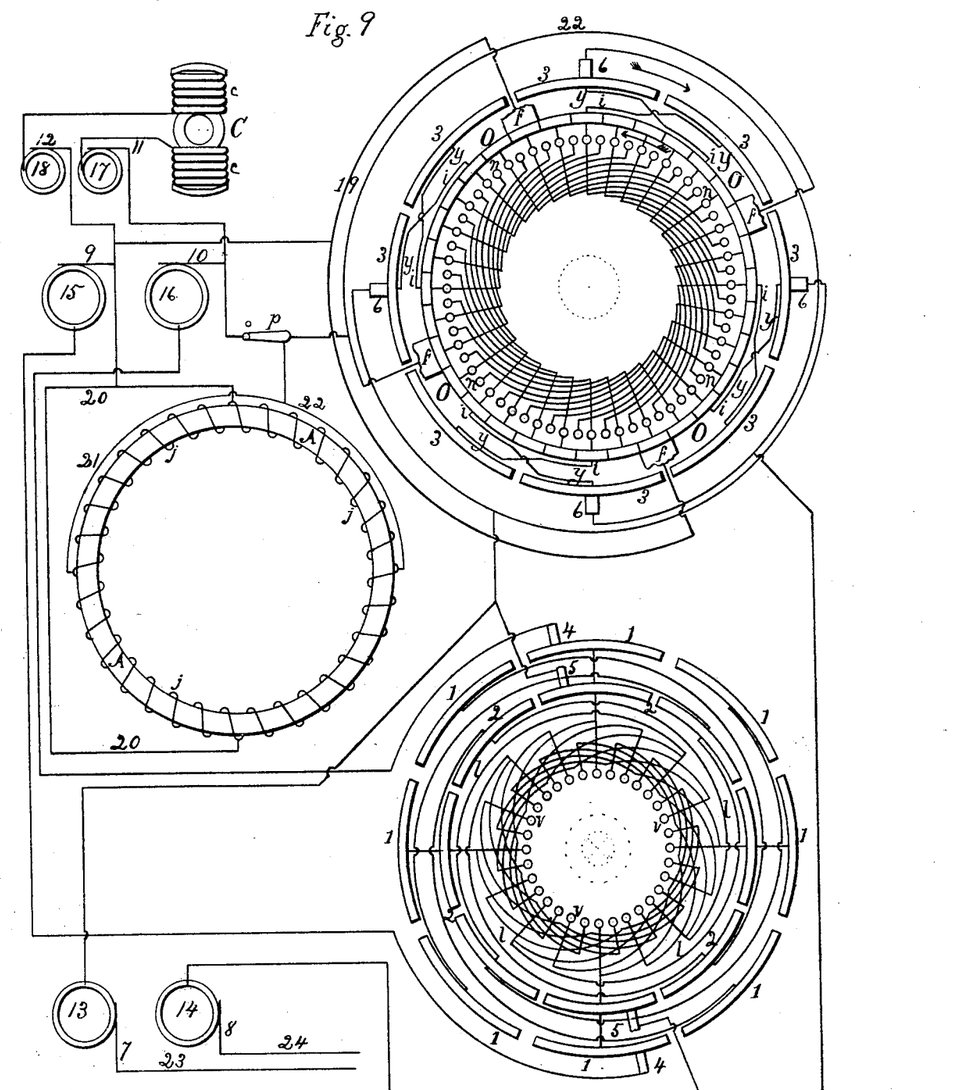
Fig. 9 shows in diagram all the connections throughout the entire machine, all of the commutator-segments being shown outside of the windings to which they are connected.

Eight of the conductors $y$, preferably every other one, are carried up inside of the disk formed on sleeve H and terminate in copper tubes $o$, entering and supported in openings therefor near the outer edge of the disk formed on the sleeve H, which also carries the commutator O of substantially the usual construction, as shown, having in this case thirty-two segments carried upon the body $m$. Referring to Figs. 1 and 4, at eight equidistant points throughout this commutator O there are bored longitudinally therethrough holes large enough to admit the copper rods $i$ within suitable insulating-tubes, inside of which they are capable of free longitudinal movement. These rods enter at their left-hand ends the copper tubes $o$ and are enlarged at their right-hand ends, carrying thereon the copper springs $t$, while these enlarged ends of the rods $i$ are rigidly secured to the fiber ring $r$, and on the right-hand face of this fiber ring $r$ is seen a brass disk engaging a gib-piece $k$, secured on either half of the switch-lever $g$, as indicated in Fig. 3, whereby, when such switch-lever $g$ is moved to the left to the position indicated in dotted lines in Fig. 1, an electrical connection is established between eight of the commutator-segments O and the corresponding eight of the conductors $y$ passing through sleeve H. This sleeve H also carries a hub R, of any suitable insulating material, upon which are secured the three commutating-rings 1, 2, and 3, each composed of eight exactly similar and insulated segments. These commutating-rings 1, 2, and 3 are arranged, respectively, under trailing brushes 4, 5, and 6 bearing thereon. Bearing upon the commutator O are the four insulated brushes $f$, located ninety degrees apart, carried by the ring $e$, adjustably secured within ring F, supported in turn by bolts $a$ and against shoulders formed thereon. Two of these brushes $f$ only are seen in Fig. 1, and all four of them are indicated in dotted lines in Fig. 5. They are also indicated in diagram in Fig. 9. This armature B carries upon its outer periphery the conductors $n$, arranged and connected together, as indicated in Fig. 5, in a symmetrical parallel drum-winding for four poles, there being sixty-four of these conductors $n$. There are thirty-two commutator-segments O, to which they are connected at regular intervals. It will be noticed that in the winding $n$ on the armature B—that is, the end shown in the drawings, being that end toward the observer—two of the conductors $n$ are connected together subtending an arc of one less than pitch. Connections at the other end of the armature should be made between conductors subtending an arc of at least one more than pitch, in order to secure the system of winding just above mentioned. The eight of these conductors $y$ which terminate in the copper tubes $o$ make connection at their other ends with the eight commutator-segments 3 in the manner following—that is to say, every other one of such conductors $y$ is connected to the commutator-segment 3 next in advance of itself and every intermediate one to the commutator-segment 3 next in the rear of itself, going in either direction. The result of this is that, when switch-lever $g$ is moved to the left, an electrical connection is established between every other one of such commutator-segments 3 and the commutator-segment O forty-five degrees in advance thereof, and between every intermediate commutator-segment 3 and the commutator-segment O, forty-five degrees to the rear thereof, going in either direction. The eight of the connectors $y$, just mentioned, and the rods $i$, are indicated in Fig. 9 as slightly-curved lines, connected together and connecting the commutator-segments 3 with eight of the commutator-segments O in the manner just described. The result of this is that when the trailing brushes 6 are revolved relatively to the commutator-segments 3 at such a speed as to pass over one of these segments 3 at each alternation of the current supplied to the machine there will be set up in the conductors $n$ a polar progression advancing forty-five degrees for each alternation of such current. This will be more fully understood by reference to Fig. 5, where the four brushes 6 are shown in diagram inside of the segments 3, and in Fig. 9 also, where the brushes 6 are shown outside of the segments 3. It will be readily understood that starting with brushes 6 in any position—say that shown in the drawings, where vertically-positioned ones may be considered as positive and those at right angles thereto as negative—these brushes change their signs as they advance one segment in either direction. For instance, suppose them to move in the direction indicated by the arrow. It will be readily seen that to advance them one segment and change their signs will produce the same result as to move them backward one segment and keep their signs the same, and that to do either one, by reason of connections already described, produces a polar advancement or progression in the direction of the interior arrow in Fig. 5 and of the exterior one in the upper right-hand portion of Fig. 9 of just forty-five degrees in the conductors $n$. The result of this is, when field A is wound with a closed coil without any external connection, to produce a rotation of the armature B, carrying the conductors $n$ in the direction indicated by the external arrow in Fig. 5 and of the interior arrow seen in the upper right-hand portion of Fig. 9. This rotation of the armature B is caused in the same manner as in lag-motors, because at this time, as will be understood, this armature B has four poles produced therein rotatively progressing around such armature B. Such rotatively-progressive magnetic poles, acting inductively upon the field A in the well-known manner in lag-motors, produce a rotation of the armature B in a direction opposite to that of the rotation of the magnetic poles above described.

It will be readily understood that when such last-mentioned rotation—that is, the mechanical rotation of armature B—reaches synchronism the trailing brushes 6 may remain stationary and still produce this polar progression, just described, in the conductors $n$. I will now explain the method of revolving these brushes 6 at the starting up of the machine or motor.

Figure 7:
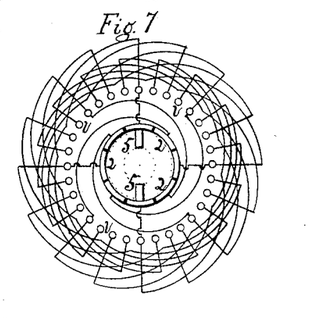
Fig. 7 shows in a diagram view similar to Fig. 5 the internal armature-windings and their connections.

The armature B carries on its inner periphery conductors $v$, arranged and connected together, as shown in diagram in Figs. 7 and 9, to produce a symmetrical bipolar drum-winding connected at eight equidistant points with eight commutator-segments 2, every other connection being made between a segment 2 and a corresponding conductor $v$ and every intermediate connection between a segment 2 and the diametrically opposite conductor $v$. The result of this, when the brushes 5, carrying alternating currents, as mentioned, are advanced one segment at each alternation in such current, is the same as though the conductors $v$ were regularly connected with segments 2 and the brushes 5 supplied direct currents.

Figure 6:
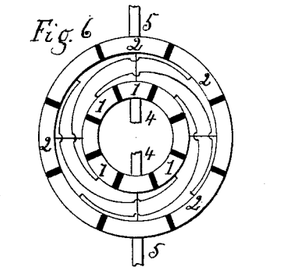
Fig. 6 shows in diagram the connections between commutator-segments 1 and 2.

Referring to Figs. 1 and 9, one of the brushes 5 is connected to collector-ring 14, while the other is connected to collector-ring 13. Wires 23 and 24 convey the alternating currents to the machine, being the main feeder-wires. Hence brushes 5 carry these main currents. Two of brushes 6 are connected with collector-ring 13 and the other two (not seen in Fig. 1) are connected with collector-ring 14. Hence brushes 6 carry the main alternating current, in derivation with brushes 5, opposite ones of brushes 6 always being of the same sign and adjacent ones of the opposite sign. One of brushes 4 is connected with collector-ring 16 and the other with collector-ring 15. Wire 25 connects springs 10 and 11 and wire 26 connects springs 9 and 12. Referring now to Figs. 6 and 9, commutator-segments 2 and 1 are connected together, as shown, every other one of segments 1 to the adjacent segment 2 and every intermediate segment 1 to a diametrically opposite segment 2. The result of this is that when brushes 5, carrying alternating currents, advance one segment for each alternation in such current, brushes 4 take off intermittent direct currents which may be collected by wires connected with springs 9 and 10.

The operation of the machine is as follows: Single-phase alternating currents are supplied to the machine by wires 23 and 24 and carried by trailing brushes 5 to the commutator-segments 2. These commutator-segments 2, eight in number, are connected by eight of the conductors $y$, carried through sleeve H to the winding $v$ on the inner periphery of the armature B. The winding $c$ on the interior field C is placed in derivation with the winding $v$ by means of the connections (shown and already described) between the commutator-segments 1 and 2 and brushes 4 and the collector-rings 15 and 16, and between springs 9 and 12 and 10 and 11. These alternating currents thus supplied through the wires 23 and 24 produce a rotation of the interior field C, shaft I, and all the collector-rings and trailing brushes carried thereby. The single-phase alternating currents supplied in the manner just described to the windings $v$ on the inner periphery of the armature B and also to the windings $c$ on the element C develop rapidly-alternating poles in the element C and also on the inner periphery of the element B. These poles, although rapidly alternating, are, by reason of the connections just described, such as to produce a constant torque effort between the elements B and C; but as the element C carries no load a rapidly-increasing rotation is set up therein until such rate of rotation reaches a point when the brushes 5 are caused to advance over one segment of the commutator 2 for each alternation of the current. At this time, however, by reason of the connections already shown and described between the commutator-segments 2 and the windings $v$ on the inner periphery of the armature B, the action of the alternating currents, it will be readily understood, is exactly the same as would be the case if direct currents were used and the connections between the commutator-segments 2 and the windings $v$ were all made as in direct-current machinery—i. e., each commutator-segment 2 connected to a corresponding point in the windings $v$; but when this rate of rotation, which really constitutes synchronism between the elements B and C, has once been reached, the windings $v$ being supplied, in effect, by direct currents, and also the winding $c$ on the element C at this time supplied with rectified currents, by reason of the connections already shown and described between segments 2 and 1, the maximum torque between elements B and C is produced. This condition results in a rigid maintenance of this relative synchronous rotation between the elements B and C in the manner already well known and understood in synchronous motors. It will be readily understood, of course, that this synchronism between the elements B and C consists in a relative rotation between them in opposite directions. Such relative synchronism may consist in the rotation of either one of such elements at a speed constituting synchronism, or they may both rotate in opposite directions, each at such a rate that the combined rate of rotation of both of them shall constitute relative synchronous rotation between them. At all times during this relative synchronous rotation between the elements B and C there may be taken off from the brushes 4, bearing on the commutator-segments 1, rectified currents. These rectified or direct currents, by reason of the connections already described, may be taken off from springs 9 and 10. Hence the interior field C is at this time supplied with such direct currents in a derived circuit, rigidly maintaining relative synchronism between the elements B and C. At this time, however, as indicated in Fig. 1 and in diagram in Figs. 5 and 9, the winding J on the field A and the conductors $n$ on the external periphery of the armature B may be supplied with direct currents in substantially the usual manner. In this case the switch $p$ is moved upward from the position indicated in Figs. 5 and 9, thus opening it, and for this purpose connections are made, such as indicated, by wires 19 and 20 and 21 and 22, furnishing four circuits in parallel through the field and armature. The action in the case just described—that is, between the elements A and B—is the same as in direct-current machinery.

It will be readily understood that at all times, while a relative synchronous rotation is maintained between the elements B and C, there is caused, or set up, in the conductors $n$ and the external periphery of the element B, rotatively-progressing fields consisting in four poles each advancing forty-five degrees for every alternation of the current supplied to the machine. These rotatively-progressing poles advance forty-five degrees for each alternation of the current supplied to the machine at all times during this relative synchronous rotation between the elements B and C, whether such relative synchronous rotation consists in the rotation of the element C only, or in the rotation of the element B only, or in the rotation of both of them together in opposite directions. This polar progression in the element B induces corresponding poles in the element A, which, lagging behind their producing cause, create a torque between the elements A and B and thereby causes the element B to rotate in a direction opposite to that of the polar progression just described in the winding $n$ and the outer periphery of the element B. This rotation of the element B, just described, increases in speed, unless the element B is overloaded, until a synchronous rotation of this element B has been attained. Then there may be supplied to the winding $j$ on the field A rectified currents taken off from springs 9 and 10, in the manner indicated in Figs. 5 and 9, producing four poles. For this purpose switch $p$ should occupy the position shown in the figure. It will be readily understood also that when the interior field C reaches synchronism, then by moving switch-lever $g$ to the left and dispensing with brushes $f$, or removing them from contact with the commutator O in any suitable manner, (not shown,) or by disconnecting them, the motor becomes then self-starting and of the lag type and remains such for all speeds of the armature B, because whatever its rate of rotation the element C is maintained in relative synchronism therewith and thus produces the uniform polar progression, just described, in the element B.

Thus it will be readily understood that before my motor starts its load it may have the full benefit of the torque produced by using rectified currents in both field and armature, except when used as a lag-motor.

When the motor is to be used as a synchronous motor, after relative synchronism has been reached between elements B and C, then rectified currents are supplied to the windings $j$ on the element A and to the windings $n$ on the element B, through the commutator O and the brushes $f$, causing the element B to revolve as in direct-current motors. When this rotation of the element B reaches synchronism, then the switch $g$ may be moved to the left, as indicated in dotted lines in Fig. 1, and the switch $p$ caused to occupy the position shown in Figs. 5 and 9, thus changing the motor to a synchronous motor operating by reason of the polar progression produced in the conductors on the outer periphery of the element B, and the rectified current supplied to the field-winding $j$.

What I claim is—

1. In an alternating-current machine, in combination with the armature and field thereof, rectifying devices carried by such armature or field and coöperating with others carried by a third element, and means for establishing and maintaining a relative synchronous rotation between such third element and the armature or field carrying such rectifying devices.

2. Three elements, one of which is located in operative relation to two others and between which and either of such other elements there exists independently the relation of armature and field, means for establishing and maintaining between two of such elements, located in operative relation to each other, a relative synchronous rotation by means of alternating currents supplied to windings on one or both of them, rectifying devices carried by said two of such elements coöperating together, and means for supplying alternating currents to such rectifying devices.

3. In combination with the armature and field of an alternating-current machine and a commutator connected with the windings on one of such elements, a third element, means for establishing and maintaining a relative synchronous rotation between such third element and such armature or field, current-rectifying devices carried by such third element and by such armature or field, and brushes carried by such third element, supplying direct currents from such rectifying devices and bearing upon such commutator.

4. In combination with the armature and field of an alternating-current machine, a third element located in operative relation to such armature or field, means for establishing and maintaining a relative synchronous rotation between such third element and such armature or such field, current-rectifying devices carried by such third element and by such armature or field coöperating together, and means for supplying to windings, on both such armature and such field, currents rectified by such rectifying devices.

5. Two elements bearing the relation to each other of armature and field, one or both of them revoluble, means for supplying to windings on one or both of such elements alternating currents and thereby establishing and maintaining a relative synchronous rotation between them, current-rectifying devices carried by such elements and coöperating together, and means for supplying the currents rectified thereby to windings on that one of such elements carrying such rectifying devices and also to windings on a third element, located in operative relation thereto, in a manner to produce an angular displacement between the poles in such last two named elements.

6. Three elements, one of which is located in operative relation to two others and between which and either of such other elements there exists independently the relation of armature and field, means for establishing and maintaining between two of such elements, located in operative relation to each other, a relative synchronous rotation by means of alternating currents supplied to windings on one or both of them, rectifying devices carried by said two of such elements coöperating together, and means for supplying direct currents from such rectifying devices to windings on the third one of such three elements and also to windings on that one of the other two of such three elements located in operative relation thereto.

7. In combination with the armature and field of an alternating-current machine, a third element or member, current-rectifying devices carried by such armature or field and coöperating with others carried by such third element or member, and means for producing and maintaining a constant relative synchronous rotation between such third element or member and such armature or field carrying such rectifying devices, and means for supplying the currents rectified thereby to windings on such armature and on such field, and for maintaining an angular displacement between the poles produced thereby in such armature and in such field.

8. Three elements, one of which is located in operative relation to two others, and between which and either of such other elements there exists independently the relation of armature and field, means for establishing and maintaining between two of such elements, located in operative relation to each other, a relative synchronous rotation by means of alternating currents supplied to windings on one or both of them, rectifying devices carried by said two of such elements coöperating together, and means for supplying direct currents from such rectifying devices to windings on that one of such three elements located in operative relation to the other two.

9. In combination with the armature and field of an alternating-current machine, a third element, means for establishing and maintaining a relative synchronous rotation between such third element and such armature or such field, current-rectifying devices carried by such third element and such armature or field coöperating together, and means for supplying to windings on the one of such armature or field, carrying such rectifying devices, direct currents from such rectifying devices.

10. In an alternating-current machine, in combination with the two elements thereof, constituting the armature and field, rectifying devices carried in part by one of such elements and coöperating with others carried by a third element, means for establishing and maintaining a relative synchronous rotation between said one of such first-named elements and such third element, and means for supplying rectified currents from such rectifying devices to windings on the other one of such first-named elements.

11. In an alternating-current machine, in combination with the two elements thereof, constituting the armature and field, a commutator connected to the windings on one of such elements, rectifying devices carried by the other one of such elements coöperating with others carried by a third element, such third element also carrying brushes bearing on such commutator and supplying rectified currents from such rectifying devices, and means for establishing and maintaining a relative synchronous rotation between such third element and that one of such first-named elements carrying such rectifying devices.

12. Three elements, one of which is located in operative relation to two others, and between which and either of such other elements there exists independently the relation of armature and field, means for establishing and maintaining between two of such elements, located in operative relation to each other, a relative synchronous rotation by means of alternating currents supplied to windings on one or both of them, rectifying devices carried by said two of such elements coöperating together, and means for supplying direct currents from such rectifying devices to windings on the third one of such three elements.

13. In an alternating-current machine, in combination with the two elements thereof, constituting the armature and field, rectifying devices carried in part by one of such elements and coöperating with others carried by a third element, means for establishing and maintaining a relative synchronous rotation between said one of such first-named elements and such third element, and means for supplying rectified currents from such rectifying devices to windings on the other one of such first-named elements, producing poles therein bearing a constant angular relation to those in said one of such first-named elements bearing the relation of armature or field thereto.

14. Three elements, one of which is located in operative relation to two others, and between which and either of such other elements there exists independently the relation of armature and field, means for establishing and maintaining between two of such elements, located in operative relation to each other, a relative synchronous rotation by means of alternating currents supplied to windings on one or both of them, rectifying devices carried by said two of such elements coöperating together, and means for supplying direct currents from such rectifying devices to windings on the third one of such three elements, producing poles therein bearing a constant angular relation to those in that one of such three elements in operative relation to the other two.

15. In an alternating-current machine, in combination with the two elements thereof, constituting an armature and field, means for producing rotatively-progressing poles or series of poles in one of such elements, rectifying devices carried in part by said one of such elements, coöperating with others carried by a third element, means for establishing and maintaining a relative synchronous rotation between said one of such first-named elements and such third element, and means for supplying rectified currents from such rectifying devices to windings on the other one of such first-named elements and for producing poles therein bearing a constant angular relation to the rotatively-progressing poles produced in the first-named one of such two elements constituting the armature and field.

16. In an alternating-current machine, in combination with the two elements thereof, constituting the armature and field, a commutator connected to the windings on one of such elements, means for producing rotatively-progressing poles or series of poles in the other one of such elements, rectifying devices carried by said other one of such elements coöperating with others carried by a third element, such third element also carrying brushes bearing on such commutator and supplying rectified currents from such rectifying devices, and means for establishing and maintaining a relative synchronous rotation between such third element and that one of such first-named elements carrying such rectifying devices.

17. Three elements, one of which is located in operative relation to two others and between which and either of such other elements there exists independently the relation of armature and field, means for producing in said one of such elements, located in operative relation to the other two, rotatively-progressing poles or series of poles, means for establishing and maintaining between such element and one of the other two elements, located in operative relation thereto, a relative synchronous rotation, rectifying devices carried by such last two named elements, coöperating together, and means for supplying direct currents from such rectifying devices to windings on the third one of such three elements, and for producing poles therein bearing a constant angular relation to the rotatively-progressing poles or series of poles produced in that one of such three elements located in operative relation to the other two.

18. Two elements, bearing the relation to each other of armature and field, one or both of them revoluble, means for supplying to the windings on one or both of such elements, alternating currents and thereby establishing and maintaining a relative synchronous rotation between them, in combination with current-directing devices, carried by such elements and coöperating together, constituting means for producing a polar progression in conductors arranged on one of such elements, located in operative relation to a third element to which it bears the relation of armature or field.

19. Two elements bearing the relation to each other of armature and field, one or both of them revoluble, means for supplying to windings on one or both of such elements alternating currents and thereby establishing and maintaining a relative synchronous rotation between them, in combination with current-directing devices, carried by such elements and coöperating together, constituting means for producing a polar progression in conductors arranged on one of such elements, located in operative relation to a third element to which it bears the relation of armature or field, such third element wound with insulated wire.

20. Two elements bearing the relation to each other of armature and field, one or both of them revoluble, means for supplying to windings on one or both of such elements alternating currents and thereby establishing and maintaining a relative synchronous rotation between them, in combination with current-directing devices, carried by such elements and coöperating together, constituting means for producing a polar progression in conductors arranged on one of such elements, located in operative relation to a third element to which it bears the relation of armature or field, such third element wound with insulated wire in a closed coil.

21. In an alternating-current machine, in combination with the two elements thereof, constituting the armature and field, current-directing devices carried in part by one of such elements and coöperating with others carried by a third element, means for establishing and maintaining a relative synchronous rotation between said one of such first-named elements and such third element, means for supplying alternating currents to such current-directing devices, such current-directing devices constituting means for producing, in that one of such first-named elements carrying them, a constant polar progression at all times during such synchronous rotation.

22. In an alternating-current machine, in combination with the two elements thereof, constituting the armature and field, current-directing devices carried in part by one of such elements and coöperating with others carried by a third element, means for establishing and maintaining a relative synchronous rotation between said one of such first-named elements and such third element, the other one of such first-named elements wound with insulated wire, means for supplying alternating currents to such current-directing devices, such current-directing devices constituting means for producing, in that one of such first-named elements carrying them, a constant polar progression at all times during such synchronous rotation.

23. In an alternating-current machine, in combination with the two elements thereof, constituting the armature and field, current-directing devices carried in part by one of such elements and coöperating with others carried by a third element, means for establishing and maintaining a relative synchronous rotation between said one of such first-named elements and such third element, the other one of such first-named elements wound with insulated wire in a closed coil, means for supplying alternating currents to such current-directing devices, such current-directing devices constituting means for producing, in that one of such first-named elements carrying them, a constant polar progression at all times during such synchronous rotation.

24. In an alternating-current machine, an element wound with insulated wire connected with the sections of a commutator having brushes bearing thereon, another element located in operative relation to such first-named element, means, independent of relative rotation between such elements, for producing and maintaining a relative synchronous rotation between such commutator and such brushes, means for supplying alternating currents to such brushes, such insulated wire so connected to such commutator-sections that such synchronous rotation between such commutator and such brushes shall produce a polar progression in the windings on such first element.

25. In an alternating-current machine, an element wound with insulated wire connected with the sections of a commutator having brushes bearing thereon, another element located in operative relation to such first-named element, means, independent of relative rotation between such elements, for producing and maintaining a relative synchronous rotation between such commutator and such brushes, means for supplying alternating currents to such brushes, such insulated wire so connected to such commutator-sections that such synchronous rotation between such commutator and such brushes shall produce a polar progression in the windings on such first element, such other element wound with insulated wire.

26. In an alternating-current machine, an element wound with insulated wire connected with the sections of a commutator having brushes bearing thereon, another element located in operative relation to such first-named element, means, independent of relative rotation between such elements, for producing and maintaining a relative synchronous rotation between such commutator and such brushes, means for supplying alternating currents to such brushes, such insulated wire so connected to such commutator-sections that such synchronous rotation between such commutator and such brushes shall produce a polar progression in the windings on such first element, such other element wound with insulated wire in a closed coil.

27. In an alternating-current machine, two magnetically-distinct windings, having a common mechanical support, a separate element located in operative relation to each of such magnetically-distinct windings, means for producing and maintaining a relative synchronous rotation between one of such separate elements and the windings located in operative relation thereto, in combination with current-directing devices controlled by such synchronous rotation constituting means for producing a polar progression in the other winding.

28. In an alternating-current machine, two magnetically-distinct windings, having a common mechanical support, a separate element located in operative relation to each of such magnetically-distinct windings, means for producing and maintaining a relative synchronous rotation between one of such separate elements and the windings located in operative relation thereto, in combination with current-directing devices controlled by such synchronous rotation, constituting means for producing a polar progression in the other winding; that element located in operative relation to such last-named winding wound with insulated wire.

29. In an alternating-current machine, two magnetically-distinct windings, having a common mechanical support, a separate element located in operative relation to each of such magnetically-distinct windings, means for producing and maintaining a relative synchronous rotation between one of such separate elements and the winding located in operative relation thereto, in combination with current-directing devices controlled by such synchronous rotation, constituting means for producing a polar progression in the other winding; that element located in operative relation to such last-named winding wound with insulated wire in a closed coil.

30. In an alternating-current machine, two magnetically-distinct windings, having a common mechanical support, a separate element located in operative relation to each of such magnetically-distinct windings, means for producing and maintaining a relative synchronous rotation between one of such separate elements and the windings located in operative relation thereto, in combination with current-directing devices controlled by such synchronous rotation, constituting means for producing a polar progression in the other winding, (that element, located in operative relation to such last-named winding, wound with insulated wire,) current-rectifying devices controlled by such synchronous rotation, and means for supplying the alternating currents rectified thereby to the windings on such last-named element, and producing therein poles maintaining a constant angular relation to those progressively set up in that winding located in operative relation thereto.

31. In combination with the armature and field of an alternating-current machine, rectifying devices coöperating together and carried by mechanism forming an organized part of such machine and controlled in its operation by alternating currents supplied to the machine, means for supplying alternating currents to such rectifying devices, means for supplying such alternating currents so rectified, by such rectifying devices, to such armature or to such field, such rectifying devices located in series with the windings on such armature or on such field, and constituting means for rectifying such alternating currents independent of the rate of relative rotation between such armature and field.

32. In an alternating-current machine, in combination with the armature and field thereof, current-directing devices for supplying such alternating currents to windings on one of such elements of armature or field, constituting means for producing, in said one of such elements, magnetic poles which shall remain constant in sign for all rates of relative rotation between such armature and such field.

33. In an alternating-current machine, in combination with the armature and field thereof, current-directing devices for supplying such alternating currents to windings on such armature and on such field, constituting means for producing in such armature and in such field magnetic poles which shall remain constant in sign for all rates of relative rotation between such armature and such field.

34. In an alternating-current machine, in combination with the two elements constituting the armature and field thereof, current-directing devices for supplying such alternating currents to the windings on one of such elements of armature or field, constituting means for producing, in said one of such elements, magnetic poles or series of poles, rotatively progressing therein at a fixed and uniform rate, at all times and for all speeds of relative mechanical rotation between such elements.

35. In an alternating-current machine, in combination with the two elements constituting the armature and field thereof, current-directing devices for supplying such alternating currents to the windings on such armature or on such field, constituting means for producing in one of such elements magnetic poles or series of poles, maintaining, at all times and for all speeds of relative mechanical rotation between such armature and field, such a relation to any given point in the periphery of such other element, as shall constitute a relative synchronous, mechanical rotation between such magnetic poles or series of poles and such given point.

36. In an alternating-current machine, in combination with the two elements constituting the armature and field thereof, current-directing devices for supplying such alternating currents to the windings on such armature and on such field, constituting means for producing in one of such elements, magnetic poles or series of poles, maintaining, at all times and for all speeds of relative mechanical rotation between such armature and field, such a rate of progression, relative to any given point in said one of such elements, as shall constitute the difference between the actual rate and a synchronous rate of mechanical rotation of such other element.

37. In a machine for use with alternating currents, in combination with the armature and field thereof, current-directing devices for supplying such alternating currents to windings on such armature and on such field, constituting means for producing magnetic poles or series of poles in such armature and in such field, such magnetic poles or series of poles, in either one or both of such elements, rotatively progressing at such a rate, that, for all relative rates of mechanical rotation between such elements, the united rates of rotative progression of the magnetic poles or series of poles in each of such elements, relative to a fixed point outside of such elements, shall be equal to a synchronous rate of advance or progression.

WM. H. COOLEY.

Witnesses:
HOWARD L. WILSON,
HARRISON L. WILSON.